United States Patent Office 3,116,633
Patented Jan. 7, 1964

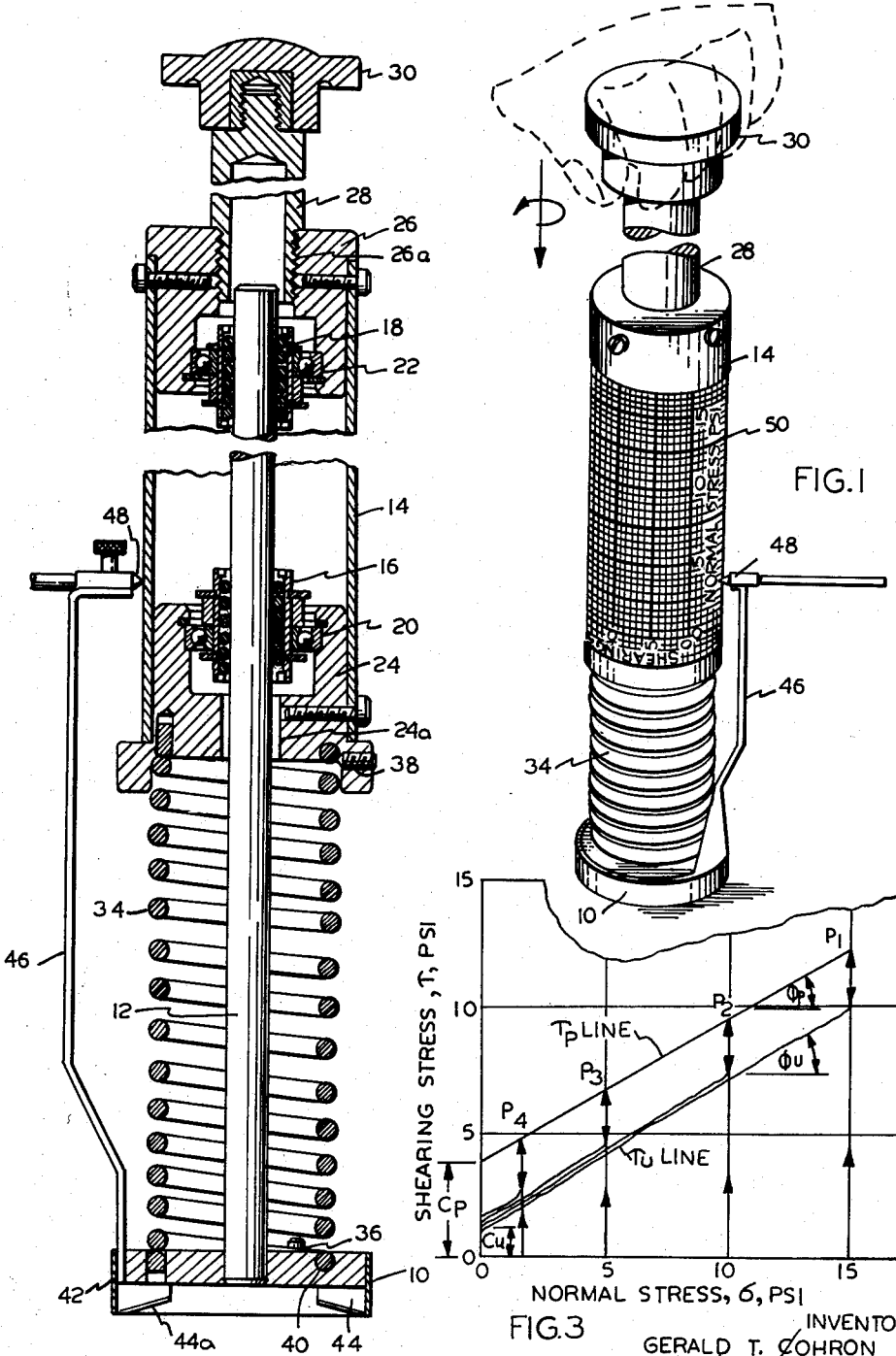

3,116,633
INSTRUMENT FOR MEASURING SHEARING STRESS-NORMAL STRESS RELATIONSHIPS OF SOILS
Gerald T. Cohron, Chestertown, Md., assignor to Wilson, Nuttall, Raimond Engineers, Inc., Chestertown, Md., a corporation of Maryland
Filed June 15, 1962, Ser. No. 202,911
4 Claims. (Cl. 73—101)

This invention relates to improvements in instruments for measuring shearing stress-normal stress relationships of soils and more particularly to a so-called soil sheargraph capable of giving a plot of soil shearing stress, i.e. horizontal shearing strength, in relation to normal stress, i.e. force per square inch applied perpendicularly to the potential shear surface, of soils generally and particularly those involved in the operation of earth-moving, tillage and cross-country machinery.

The importance of soil properties to the performance of earth-moving, tillage and traction type machines and equipment has only recently been appreciated. While some limited recognition had earlier been given by civil engineers, for example, to the fact that soil could be treated as an engineering medium, and more recently by the military interested in improving and extending the mobility of its fighting and logistical vehicles into extremely soft soils, an examination of the existing instruments and techniques previously employed in measuring soil properties has conclusively established that they were either impractical or inadequate in providing meaningful indication and/or measurements of the shear strength relationships useful in the determination of the engineering properties of soil as such relate to the operation of earth-moving machinery, for example.

The prior triaxial test machine, which is similar in operation in many respects to a machine used for testing steels, not only fails in providing determinations of soil properties significant to the performance of earth-moving machinery in particular, but also it is impractical in that it involves complicated laboratory techniques requiring from many hours to days to complete.

Again, while the known grouser plate- (or ring-) type soil testing device offers the most structurally simple machine of all the prior soil shear-testing instruments in that it consists only of a flat plate (or ring) with depending grouser plates and mounting deadweights providing the normal load, the techniques required in the use of such instruments are objectionable in the large amount of time required to complete a test and in converting the data obtained thereby into a meaningful plot of shear stress vs. normal stress. Also, the grouser plate- and ring-type soil testing devices are objectionable in requiring substantial auxiliary paraphernalia, i.e. weights, scales, clipboard, separate testing elements, etc. to operate.

Finally, the prior vane-type soil testing instrument, which consists primarily of a central rod mounting usually four radial vanes at its extreme lower end, with provision between an upper-end handle and the shear vanes for the determination of the torque applied to the shear vanes necessary to produce soil failure, is of substantially no use whatsover in determining shear stress-normal stress soil relationship because of the impossibility of applying varying normal stress to the cylindrical shear surface acted upon by the radial vanes.

Another prime disadvantage of the prior soil testing instruments is their inability to differentiate between, not to mention record, the peak and ultimate values of soil shear properties, the delineation between which is very meaningful to the performance of earth-moving machinery. In explanation, excluding dry, sandy soils and very soft mud, all construction and earth-moving soils display a marked peak in their stress-strain curves, such peak being important since it is a measurement of the maximum strength which the soil can develop at failure being referred to as the break-away or peak shear stress. On the other hand, after soil failure has occurred and upon continued turning motion of the perpendicularly loaded shear element, the soil will have residual shear strength of a lesser value, the latter being referred to as steady-state or ultimate shear strength. Obviously, the inability of the prior soil measuring instruments to delineate between the break-away or peak shear stress and the steady-state or ultimate shear stress renders them inadequate in providing meaningful shearing stress measurements for construction and earth-moving soils.

Stated broadly, a major object of the present invention is the provision of a soil-testing instrument capable of providing a valid determination of the shearing stress-normal stress relationship of soils useful in the performance of earth working, soil tillage, and construction machines, which is characterized by simple and extremely practical construction and, equally importantly, is further capable of giving a direct plot of said relationship so that no later conversion is required.

A more particular object of the invention is the provision of a simple and practical soil sheargraph constructed and arranged so as to give a direct record of shearing stress and normal stress on the potential shear surface of soil as aforesaid, and which is characterized by easy, one-man operation and is further capable of giving in situ measurements, i.e. it does not require removal of a soil sample, for example.

A further object of the invention is the provision of a soil sheargraph capable of giving valid measurements of the shearing stress-normal stress relationship for almost any known soil condition, which are important to the performance of earth-moving, tillage and traction-type equipment.

Yet another object of the invention is the provision of a soil sheargraph constructed and arranged so as to be capable of giving a meaningful soil measurement with minimal soil disturbance from the insertion of its shear elements into the soil.

Still another object of the invention is the provision of a soil sheargraph of light weight and easily portable construction.

A still further object of the invention is the provision of a soil sheargraph capable of giving a direct plot of soil shearing stress-normal stress relationship, which is featured by the use of a single spring whose axial and torsional spring rates are designed so as to yield direct indications of shear stress and normal stress at soil failure, without the need of further data conversion.

The above and other objects and features of advantage of a soil sheargraph according to the present invention will appear from the following detailed description thereof, in which reference is had to the accompanying drawing illustrating a preferred embodiment of the invention, in which—

FIG. 1 is a perspective view showing the general overall appearance of a sheargraph according to the invention and also the manner of using the same;

FIG. 2 is an enlarged broken-away longitudinal section taken through the instrument shown in FIG. 1; and FIG. 3 is a somewhat simplified but generally typical reproduction of a plot of the shear stress-normal stress relationship obtained by a series of soil shear tests made by the sheargraph shown in FIGS. 1 and 2.

Referring to the drawing in detail, FIG. 1 illustrates that a soil sheargraph as herein proposed comprises a shear head 10 rigidly affixed to one, i.e. the lower, end of a central shaft or rod 12, whose upper end extends into and is coaxial with a cylindrical recording drum 14. To provide for friction-free axial and rotational motion of the central shaft relative to said drum, the shaft 12 operates through axially spread antifriction ball bushings generally designated 16, 18 which are encircled by and in turn operate in roller bearings 20, 22 whose outer races are suitably secured within the inwardly opening bores of plug-form end caps or members 24, 26 secured respectively to and serving to close the ends of the recording drum 14, except for central holes 24a, 26a extending axially through said end caps, of which the central hole 24a of the lower end cap 24 provides for the entry of the upper end of the central shaft 12 to the interior of the recording drum 14.

Extending into the hole 26a of and threadedly secured to the opposite or upper end cap 26 is the lower tubular end of a handle stem 28, the upper end of which fixedly mounts a handle 30 shown to take the form of a circular knob but which may, if desired, be a corss-bar type handle. It will be observed that the tubular formation of the lower end of the handle stem 28 accommodates for substantial axial movement of the upper end of the shaft 12 thereinto.

A single or unitary spring 34 interposed between the shear head 10 and the recording drum 14 and encircling the shaft 12 serves as the sole connecting means between said head and drum, it being observed (FIG. 2) that the lower end of the spring is affixed to the upper side of the shear-head end plate as by a cap screw 36 and that the upper end of the spring is socketed in and affixed to the lower end cap 24a of the recording drum by a socket set-screw 38. By this form of spring-to-shear head and recording drum connection, both axial and torsional loads may be transmitted from the handle 30 to the shear head 10.

As indicated in FIGS. 1 and 2, the aforesaid shear head 10 has inverted shallow cup-shaped configuration and comprises a heavy circular end or bottom plate 40 from which depends a thin steel shear ring 42 and a plurality (usually three) of thin steel grousers or vanes 44 which project radially inwardly into the ring enclosure for a distance of about one-third ring radius and whose bottom edge is preferably sloped upwardly (relieved) by a small angle from the horizontal, as generally indicated at 42a. The shear head 10 also mounts an upwardly extending spring steel arm 46 to whose upper end is affixed a recording stylus 48 arranged to trace a plot of the axial and torsional forces and their relationships applied to the shear head on to a piece of pressure-sensitive recording paper (designated 50, FIG. 1) placed on the recording drum 14.

Reverting to the unitary spring 34, such is of the coil type and its design is such that its axial and torsional spring rates give direct indication (via the recording stylus 48) of shear stress and normal stress, i.e. force per square inch applied to the soil being tested, thus to obviate the necessity of further data conversion. Such of course assumes proper calibration of the pressure-sensitive recording paper, a balance of the torsional deflection of the spring and diameter of the recording drum, and corresponding balance of axial deflection of the spring with the size of shear head in relation to the p.s.i. normal stress capable of being comfortably applied by the operator.

The operation of the soil sheargraph according to the invention is quite simple. The pressure-sensitive chart or paper 50 is first affixed to the recording drum 14 in position such that upon its removal increasing shear stresses are recorded vertically while normal stresses are recorded horizontally, and thus proper placement of the chart requires that the normal stress line graduations extend axially and the shear stress lines extend circumferentially, as appears in FIG. 1. Also to be noted is that the desired disposition of the plot or curves on the chart require that in operation the motion of the handle 30 and corresponding motion of the recording drum 14 must be counterclockwise when applying shear stress.

Next the shear head 10 is inserted into the soil to be examined until the inner surface of the shear-head end plate 40 rests firmly on and makes good contact with the soil surface. After full insertion of the head as aforesaid, the soil should be loosened around the outer periphery of the shear ring 42 in order to avoid the possibility of the soil-to-metal friction on the outer surface of the shear ring 42 giving a falsely high reading of shear stress.

As mentioned in the foregoing, most agricultural and earth-moving soils, particularly the latter, display definite peak shear stress values and, upon failure accompanied by continued application of normal stress, a smaller residual shear strength referred to herein as the ultimate or steady-state shear strength which of course depends largely on the properties of cohesion and internal friction of the particular soil being tested. To discriminate between and obtain a plot of peak and ultimate shear stress relationships at different applied normal stresses, a normal stress is applied by the operator pushing down on the handle 30 and thereby the shear head 10 with a force which effects a predetermined axial deflection of the spring 34, say with a force of 30 lbs. which, with the effective area of the shear head under plate or disc 40 being 2 sq. in., results in a normal stress of 15 p.s.i. being placed on the shear head, and by proper choice of spring rate of said spring, an axial deflection of 2 in. thereof. While maintaining such normal stress, the operator then proceeds to turn the handle and thereby the recording drum 14 in counterclockwise direction until peak shear stress failure occurs. Thereupon, the normal stress of 15 p.s.i. is maintained for a short time, during which turning motion of the shear head is re-started, such giving a value of steady-state or ultimate shear stress. Then the normal stress is reduced gradually and the shear head will rotate slowly without further turning of the handle 30, for the reason that the soil will maintain only a certain value of shear stress at any given normal load applied thereto. Thus, as the normal load or stress is decreased gradually, there is a corresponding decrease in the shear stress. As the stylus 48 is in continuous pressure contact with the pressure-sensitive record sheet 50 during the aforesaid axial and rotational movement of the recording drum 14 with respect thereto, such stylus will faithfully trace a curve showing the relationship of peak and steady-state shear stress vs. normal stress. Also, since the device operates on the principle that soil shearing strength is a direct function of the normal stress on the shearing surface, the value of shearing stress recorded by the stylus at any instant is directly proportional to the normal stress and thus, as such force is removed from the operating handle 30, whereupon the shearing stress reduces proportionally, the trace made on the record drum is that of the exact function of steady-state or ultimate shear stress vs. normal stress. Preferably, the aforesaid operations of applying normal stress and thereupon shearing stress on the potential shear surface of the soil are repeated at several different values of normal stress, such as 15, 10 and 5 p.s.i. of applied normal force. Also, it is advisable, in testing some soils, to repeat the test using the maximum normal stress of 30 lbs. of applied force (15 p.s.i.) by leaving the failed soil in the shear head and replacing it in the spot from which it came originally. However, when repeating the test at different values of normal stress as aforesaid to obtain peak shear stresses, the shear head must be cleaned of the failed soil between successive tests.

To explain both the nature of the plot or plots of peak shear and ultimate or steady-state shear stress vs. normal stress possible of attainment with a soil sheargraph of the invention, and the manner in which said plots are interpreted to give meaningful information, reference is had to FIG. 3 illustrating four typical although somewhat idealized tracings of a series of four shear stress vs. normal stress relationships of a particular soil made with normal applied stresses of 15, 10, 5 and 2 p.s.i., which tests are consecutively numbered and will be referred to as tests 1, 2, 3 and 4. The arrows applied to the four traces indicate direction of stylus travel in making same under all four test conditions. From the trace of plot made during the course of test No. 1, wherein the maximum normal stress of 15 p.s.i. was applied, it will be observed that soil failure occurred at a peak shear stress of approximately 12 p.s.i. (see $P_1$) and thereupon exhibited an ultimate or steady-state shear strength of about 10 lbs. p.s.i., from which point the shear strength or stress decreased proportionately with decrease or normal applied stress to zero. Similarly, the trace or plot of test No. 2 using a normal stress of 10 p.s.i. exhibits a shear stress (note point $P_2$) of about 10 p.s.i. and a steady-state or ultimate shear stress beginning at about 7 p.s.i. and decreasing with decrease of the applied normal stress on a curve which coincides substantially with the curve of decreasing shear stress vs. normal stress taken during test No. 1 aforesaid. Similarly, the plot of test No. 3 shows that with a normal applied stress of 5 p.s.i., the soil under test exhibited a peak shear strength of about 7 p.s.i. and a steady-state or ultimate shear strength beginning at about 4 p.s.i. and decreasing with decrease in the normal applied shear stress on a curve which again substantially coincides with the curves of decreasing shear stress vs. normal stress according to tests No. 1 and No. 2. Without detailing same, it will be noted that test No. 4 shows substantially the same relationship of shear stress vs. normal stress under an applied normal stress of 2 p.s.i.

Upon completion of the four tests just briefly discussed, a so-called $\tau_p$ line is struck through the four points $P_1$, $P_2$, $P_3$ and $P_4$ of peak shear stress, and it will be observed that this line intercepts the "0" vertical or ordinate axis line well above the horizontal or the "0" horizontal or abscissa line by an amount designated $C_p$ in FIG. 3, and also that said $\tau_p$ line is at an angle $\phi_p$ with a parallel to said "0" abscissa line. Similarly, a line $\tau_u$ struck through the lines (curves) of steady-state or ultimate shear stress intercepts the "0" ordinate axis as a distance designated $C_u$ above the "0" abscissa line and further makes an angle designated $\phi_u$ with a parallel to said abscissa line.

Summarizing, the data noted and the information provided by said four traces or plots described are generally as follows:

Intercept of $\tau_p$ line with "0" $\sigma$ axis=$C_p$ read directly.
Intercept of $\tau_u$ line with "0" $\sigma$ axis=$C_u$ read directly.
Angle of $\tau_p$ line with horizontal (line parallel to $\sigma$ axis)=$\phi_p$ (measured with protractor).
Angle of $\tau_u$ line with horizontal=$\phi_u$.

Where:

$C_p$=peak soil cohesion, p.s.i.
$C_u$=ultimate soil cohesion, p.s.i.
$\phi_p$=peak angle of internal friction, degrees.
$\phi_u$=ultimate angle of internal friction, degrees.

While the foregoing description has emphasized use of the soil testing instrument of the invention in determining shear properties of soil at different normal stress applied perpendicularly thereto, it may also be usefully employed to determine frictional properties or relationships under normal stress occurring both at a soil-metal interface and a soil-rubber interface, respectively, by substituting for a shear head provided with grousers or vanes 44 as described, a shear head having a bottom plate with a plane metal soil-engaging face devoid of such vanes or a shear head having a plane engaging face of rubber, which is similarly devoid of such vanes.

Without further analysis, it will be appreciated that a soil sheargraph as disclosed satisfies the objectives of the invention as explained in the foregoing in simple, effective and exceedingly practical manner. However, as many changes could be made in carrying out the above constructions without departing from the scope of the invention, it is intended that all matter contained in the above description or shown in the accompanying drawing shall be interpreted as illustrative and not in a limiting sense.

I claim:

1. A soil sheargraph comprising, in combination, a shear head mounting a shear ring having radially-inwardly directed vanes adapted to be forced into the soil to be tested, a shaft affixed at its lower end to said shear head, a recording drum coaxially related to said shaft and into which the upper end of the shaft extends, bearing means interposed between the drum and shaft and providing for friction-free relative axial and rotational movement therebetween, spring means interposed between and providing the connection between the recording drum and the shear head and whose axial and torsional spring rates are such as to be capable of imparting axial and rotational motion to the shear head directly proportional to shear and normal stress applied thereto through the spring means, means for applying such relative motion to the shear head, and means operative between the shear head and recording drum for directly plotting such relative motion and thereby the shear-normal stress relationships of the torsional stresses causing soil failure at different normal stresses applied to said shear head.

2. A soil sheargraph according to claim 1, wherein said spring means comprises a coil spring having its ends connected respectively to the lower end of the recording drum and the upper end of the shear head.

3. A soil sheargraph according to claim 1, wherein said plotting means includes a sheet mounted on said recording drum and calibrated in terms of torsional against normal stress, and a recording stylus mounted on and extending upwards from the shear head and disposed in scribing engagement with said sheet.

4. A soil sheargraph according to claim 1, wherein said means for applying relative motion to the shear head comprises an operator's handle extending upwardly from and rigidly affixed to the upper end of the recording drum, said drum itself and said spring means.

References Cited in the file of this patent

UNITED STATES PATENTS

| | | |
|---|---|---|
| 2,607,218 | Hansen | Aug. 19, 1952 |
| 2,656,718 | Dames et al. | Oct. 27, 1953 |
| 2,709,363 | Lea | May 31, 1955 |